July 6, 1965 D. R. DAYKIN 3,193,693

PULSE GENERATING CIRCUIT

Filed Dec. 29, 1959

INVENTOR
DONALD R. DAYKIN

BY Charles S. Neave
AGENT 3,193,693

PULSE GENERATING CIRCUIT

Donald R. Daykin, Vestal, N.Y., assignor to International Business Machines Corporation, New York, N.Y., a corporation of New York Filed Dec. 29, 1959, Ser. No. 862,568
1 Claim. (Cl. 307—88)

This invention relates to pulse generating circuits and more particularly to such circuits that are utilized to provide current pulses to load devices having reactive components.

Constant current sources are frequently required for pulse circuits of computer systems and are particularly required as a driving medium for computer circuits using magnetic cores.

Pulse generators are well known in the prior art and include those in which pulses are formed with the aid of an artificial delay line and those in which a reactance is first charged and then discharged through the load. Such pulse generators are capable of generating substantially rectangular voltage pulses which, if applied to a resistive load, will cause substantially rectangular current pulses to flow. However, if the load contains reactive components, the charge accumulated during the pulse causes current to flow through the load even though the voltage of the pulse generator is returned abruptly to its zero state.

This invention contemplates circuitry which overcomes the disadvantages of conventional pulse generators and uses more efficient and reliable switching mechanism that requires a minimum of external voltage sources. Saturable elements, such as, saturable reactors or inductors, are utilized to facilitate the switching problems.

It is an object of this invention to provide a pulse generator which uses saturable elements as switching mechanism.

It is a further object of this invention to provide a high current from a relatively low voltage source.

It is a further object of this invention to provide a simplified current pulse generator which contains few components.

It is a still further object of this invention to provide a current pulse source for driving magnetic core circuits.

It is still another object of this invention to provide a current pulse source adapted to produce current pulses having short rise and fall times.

Briefly, the invention comprises a transistorized control means for charging a condenser connected in parallel with a load circuit. During the time the capacitor is being charged, a saturable square loop core serially coupled with the load is being switched. When the core saturates, it becomes a very much lower impedance and permits the charged capacitor to discharge rapidly into the low impedance load, thereby producing a much larger current in the load than originally flowed through the charging circuit. In this manner, a substantial current multiplication can be obtained, and it is possible to obtain output pulse durations which are much shorter than the turn-on and turn-off times of the control circuit. Such output current pulses are particularly useful as a driving medium for many types of core logic circuits frequently employed in computer circuits.

A novel feature of this invention is the combination of a diode in series with the load. Another novel feature of this invention is the combination of an inductance in the load circuit comprising the capacitor, a square loop core, the diode, and the load such that after saturation of the core there is provided an under-damped circuit with the capacitor and the resistances effective in the circuit during the discharge time for the capacitor. Furthermore, this invention causes a capacitor to discharge to a negative value by the end of the discharge pulse so that the negative charge causes the diode to open the load circuit and to maintain it in an open condition ineffective against any negative voltages developed in the load after the termination of the driving pulse.

The foregoing and other objects, features and advantages of the invention will be apparent from the following more particular description of preferred embodiments of the invention, as illustrated in the accompanying drawings:

Figure 1:
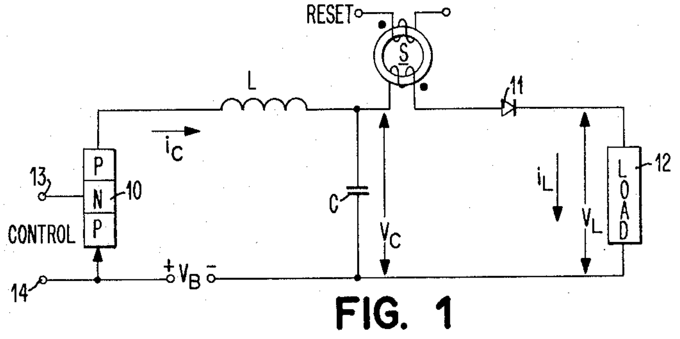
FIG. 1 is a circuit diagram of a preferred embodiment of the invention.

Referring to FIG. 1, a pulse generating circuit embodying the present invention is shown to include a D.C. source of potential $V_B$ having its positive terminal connected in series circuit combination with a PNP transistor 10, an inductor L, a capacitor C, and to the negative terminal of the voltage source $V_B$. A series circuit combination of an input winding on core element S, a diode 11 and load 12 is connected in parallel circuit configuration with the capcitor C. Herein the core element S is a switching core having rectangular hysteresis loop properties. Cores having these properties are capable of being switched from one of two possible conditions of magnetization to the other by a magnetizing force exerted by associated electrical windings. The impedance of the windings on the cores changes substantially when the cores reach a state of saturation. The core, conveniently, may be fabricated in a toroidal shape. In the preferred embodiment, the core has an input winding and a reset winding. Current flowing out of a winding from a dot-marked end is arbitrarily assumed to produce a counterclockwise flux in the core. Stated otherwise, the core is switched in a positive direction. Current flowing into a winding at a dot-marked end then produces a clockwise flux in the core. Stated otherwise, the core is switched in a negative direction.

When through the medium of a control signal applied to the terminals 13 and 14, the PNP transistor 10 is turned ON, the capacitor C will charge through the inductance L until a peak of voltage of approximately twice the supply voltage $V_B$ is reached. During this charging interval, the core element S is being switched to a positive direction. Through the medium of design, the switching of the core element S will be completed approximately coincident with $V_C$ reaching a peak value, as indicated in the voltage wave forms of FIG. 2.

When the core element S saturates in the positive direction, the impedance of the input winding becomes substantially lower and permits the charged capacitor C to discharge rapidly into the impedance of load 12, thereby producing a substantially larger current in the load 12 with respect to the current which flowed during the time the capacitor C was being charged. Consequently, a very large current multiplication can be obtained in this manner (see the current wave forms of FIG. 2), and it is possible to produce output current pulses of much shorter durations than the turn-on and turn-off times of the transistor 10. Such current pulses are extremely useful for driving many types of core logic, such as is frequently used in computer circuits.

Figure 2:
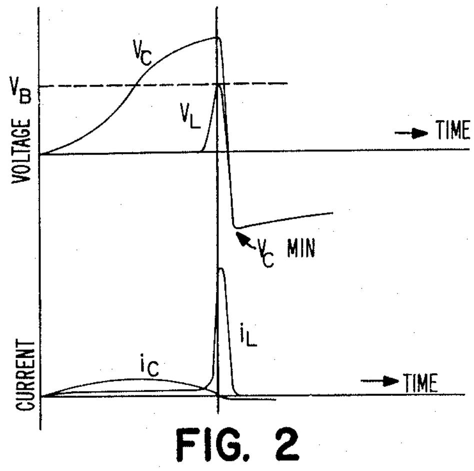
FIG. 2 is a plot of the voltage and current characteristics of the circuit shown in FIG. 1.

A novel feature of the invention is the combination of the diode 11 in series with the load 12, as shown in FIG. 1. Another novel feature of the invention is the combination of the inductance of the input winding on core element S with the reactance of the capacitor C such that the circuit comprising capacitor C, the input winding of the core element S, the diode 11 and load 12 forms an under-damped circuit during discharge of the capacitor C. The effect of this condition is to cause the capacitor C to discharge to a negative value by the end of the discharge pulse. This negative charge causes the diode to open the load circuit and hold it open against any negative voltages developed in the load after the load pulse which do not exceed $V_C$ minimum, as indicated in FIG. 2.

Many core logic computer systems require a current driving pulse source which acts as an open circuit at the termination of the driving pulse and does not provide a path for load currents between drive pulses created by the counter E.M.F. produced by the inductive properties of the load. The above-described novel features pertaining to the circuitry of FIG. 1 provide these desirable properties.

At the termination of the discharge pulse, or shortly before the termination of the discharge pulse, the transistor 10 is turned OFF. After the discharge of capacitor C, the application of a reset current to the reset winding on the core element S switches the core element S to its negative direction. As an alternate arrangement, the reset current can be constantly applied to the reset winding of the core element S with the charging current through the transistor 10 during the charging intervals for capacitor C being sufficient to overcome the current flow in the reset winding of the core element S, thereby causing the core element S to switch to its positive direction.

Figure 3:
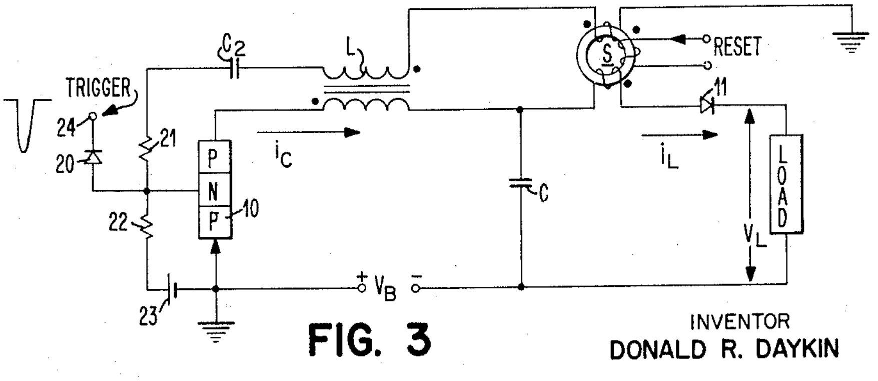
FIG. 3 is a circuit diagram showing the basic circuit of FIG. 1 with control means therefor.

Referring now to FIG. 3, there is shown a simple method for controlling the transistor 10 of the basic circuit such as is shown in FIG. 1. Herein the inductance element L is shown to have a primary and secondary winding. The core element S has a primary winding, a secondary winding, and a reset winding. The control circuit comprises a diode 20, resistors 21 and 22, a source of unidirectional potential 23, a capacitor $C_2$ and the secondary windings on the inductive element L and the core element S.

In the normal condition, transistor 10 is biased so as to be nonconductive. A negative trigger pulse applied to terminal 24 renders the PNP transistor 10 conductive. Initially, the voltage induced in the secondary winding on the inductance element L, and later the voltage induced in the secondary winding on the core element S, serves to maintain the tansistor 10 in an ON condition, in blocking oscillator fashion, and for the duration of time that the capacitor C is being charged once the transistor 10 has been triggered. A voltage charge builds up on the capacitor $C_2$, but the circuit is designed with adequate excess feed back from the secondary winding on the core element S to maintain the transistor 10 in the ON condition. When the core element S saturates, the feed back voltage from the secondary winding on the core element S disappears. A feed back voltage reappears on the secondary winding of the inductance element L, but it is insufficient to overcome the voltage charge on the capacitor $C_2$. Consequently, the transistor 10 is turned OFF when the core element S saturates, which is the desired action.

Reset of the core element S is effected by the application of a current pulse to the reset winding thereon while the capacitor $C_2$ recharges. The transistor 10 remains in an OFF condition until it is again triggered by the application of a trigger pulse to the terminal 24.

While the invention has been particularly shown and described with reference to preferred embodiments thereof, it will be understood by those skilled in the art that the foregoing and other changes in form and details may be made therein without departing from the spirit and scope of the invention.

What is claimed is:

A plulse generating circuit comprising a potential source; a transistor; an inductive element; a first capacitor; a circuit for charging said first capacitor including said potential source, said transistor, said inductive element, and said first capacitor connected in series circuit arrangement; a load; a diode; a magnetic core type switching device having rectangular hysteresis loop properties; an input winding associated with said magnetic core being responsive to the charging of said first capacitor for setting said magnetic core in a given state of magnetic saturation; a biasing potential for said transistor; a second capacitor; a secondary winding associated with said inductive element; a secondary winding associated with said magnetic core; a control circuit for said transistor comprising said biasing potential, said second capacitor, and both of said secondary windings; means for applying a trigger pulse to said transistor to selectively render said charging circuit conductive, the voltages induced in both of said secondary windings serving to control the charge on said second capacitor in a manner that will maintain said charging circuit conductive for an interval sufficient to charge said first capacitor; a discharge circuit for said first capacitor including said first capacitor, said input winding, said diode, and said load connected in series circuit relationship, said input winding having a high impedance value during the time said capacitor is being charged and a low impedance value when said magnetic core is set in the given state of magnetic saturation to render said discharge circuit conductive and permit said capacitor to discharge into said load; said diode being operable to permit current flow in said discharge circuit in one direction only; a reset winding associated with said magnetic core; and means for applying a current pulse to said reset winding to restore said magnetic core to a state of magnetic saturation which is opposite to that of the given state of magnetic saturation.

References Cited by the Examiner

UNITED STATES PATENTS

| | | | |
|---|---|---|---|
| 2,727,159 | 12/55 | Sunderlin | 307—106 |
| 2,817,773 | 12/57 | McKenney | 307—106 |
| 2,915,645 | 12/59 | Monin | 307—88 |
| 2,946,896 | 7/60 | Alizon et al. | 307—88 |
| 3,015,739 | 1/62 | Manteuffel | 307—88 X |

IRVING L. SRAGOW, *Primary Examiner.*

EVERETT R. REYNOLDS, JOHN T. BURNS, *Examiners.*